United States Patent [19]

Chang et al.

[11] 4,448,846

[45] May 15, 1984

[54] RADIATION-CURED MAGNETIC MEDIA AND PROCESS FOR MAKING SAME

[75] Inventors: Hao-Jan Chang, Santa Clara; Akihiro Nishimura, Cupertino, both of Calif.

[73] Assignee: Ampex Corporation, Redwood City, Calif.

[21] Appl. No.: 309,632

[22] Filed: Oct. 8, 1981

Related U.S. Application Data

[63] Continuation-in-part of Ser. No. 189,979, Sep. 22, 1980, abandoned.

[51] Int. Cl.³ .............................................. H01F 10/02
[52] U.S. Cl. .................... 428/412; 252/62.54; 427/44; 427/128; 427/130; 428/413; 428/425.9; 428/477.7; 428/480; 428/522; 428/694; 428/900
[58] Field of Search ............... 428/900, 694, 412, 413, 428/425.9, 477.7, 480, 522; 427/44, 128–132; 252/62.54

[56] References Cited

U.S. PATENT DOCUMENTS

4,260,466  4/1981  Shirahata et al. ............... 427/44 X

FOREIGN PATENT DOCUMENTS

55-2701  1/1980  Japan .

Primary Examiner—Bernard D. Pianalto
Attorney, Agent, or Firm—Thomas E. Ciotti; Joel D. Talcott

[57] ABSTRACT

A magnetic medium having improved mechanical and magnetic properties comprising a nonmagnetic substrate coated with a magnetic binder composition composed of (a) a radiation-cured mixture of a high molecular weight thermoplastic polymer, such as a linear polyurethane of MW greater than 50,000, and a radiation-curable polyfunctional acrylate prepolymer and (b) magnetic particles dispersed in the radiation-cured mixture.

11 Claims, 2 Drawing Figures

RADIATION-CURED MAGNETIC MEDIA AND PROCESS FOR MAKING SAME

CROSS-REFERENCE TO RELATED APPLICATION

This application is a continuation-in-part of copending patent application Ser. No. 189,979, filed Sept. 22, 1980, abandoned.

DESCRIPTION

Technical Field

The invention relates to electron beam (EB) cured magnetic recording media and to a process for making such media.

Background Art

Magnetic media are composed of a nonmagnetic substrate or support coated with a cured resin binder containing dispersed finely divided magnetic particles. Normally the backing is made of plastic although other materials such as paper, glass, or metal can be used. Such magnetic media are ordinarily in the form of a tape, belt, disc or the like. In this regard the word "tape" is frequently used hereinafter to generically denote such media since tape is the most common form of magnetic recording media. It will be understood, however, that all forms of magnetic media are included within the scope of this invention.

The binders used in tape are typically curable high molecular weight thermoplastic polymers. These binders are usually cured in the fluid state with a chemical curing agent such as a diisocyanate. The curing process causes crosslinking of the thermoplastic polymer chains as well as other reactions involving the diisocyanate.

Chemical curing of tape binders has disadvantages and drawbacks. The curing reaction is generally unpredictable and is highly sensitive to temperature variations, moisture, and stoichiometry. More importantly it generally provides a cured binder having a lower than desired crosslink density. It also results in the curing agent being incorporated into the binder, which agent does not directly contribute to the magnetic or mechanical properties of the tape. Furthermore, as compared to the EB curing process of the present invention it requires more solvent and is more time consuming. Also, electron beam curing can bring about asymmetric curing of the magnetic binder coating wherein there is a crosslink density gradient across the coating thickness. Such curing cannot be achieved with chemical curing.

Radiation-induced curing of tape binders has also been suggested in the literature. U.S. Pat. No. 3,104,983 teaches curing butadiene-acrylonitrile tape binders with subatomic radiation. The present applicants have found, however, that EB-cured butadiene-acrylonitrile copolymer exhibits little crosslinking relative to applicant's binder. Japanese patent publication No. 12423 (1972) describes an EB-cured magnetic tape in which the binder is composed of an acrylatemethacrylate addition polymer that contains no rective acrylate groups and an acrylate or dimethacrylate monomer. The only component of this binder that is susceptible to EB-curing is the monomer. It is believed that the properties of such tapes will be relatively inferior due, among other things, to the presence of methacrylate polymers which are known to preferentially degrade when exposed to radiation.

A prime object of the present invention is to provide an EB-cured magnetic recording media having improved magnetic and mechanical properties as compared to the prior chemically cured or radiation-cured magnetic media. Another object is to provide a process for making such media that involves no chemical curing agents such as diisocyanates.

Disclosure of the Invention

One aspect of the invention is a magnetic medium comprising:
 (a) a nonmagnetic substrate coated with
 (b) a magnetic binder composition comprising
  (i) a radiation-cured mixture of a high molecular weight thermoplastic polymer and a radiation-curable acrylate prepolymer, and
  (ii) magnetic particles dispersed in the radiation-cured mixture.

Another aspect of the invention is a process for making the above described magnetic medium comprising the steps of
 (a) preparing a fluid mixture comprising:
  (i) a high molecular weight thermoplastic polymer,
  (ii) a radiation-curable acrylate prepolymer,
  (iii) a solvent for the thermoplastic polymer and acrylate prepolymer, and
  (iv) dispersed magnetic particles;
 (b) coating the fluid mixture onto a nonmagnetic substrate;
 (c) drying the coated substrate to evaporate the solvent and solidify the coating; and
 (d) exposing the dried coated substrate to sufficient radiation to cure the coating.

MODES OF CARRYING OUT THE INVENTION

Figure 1:
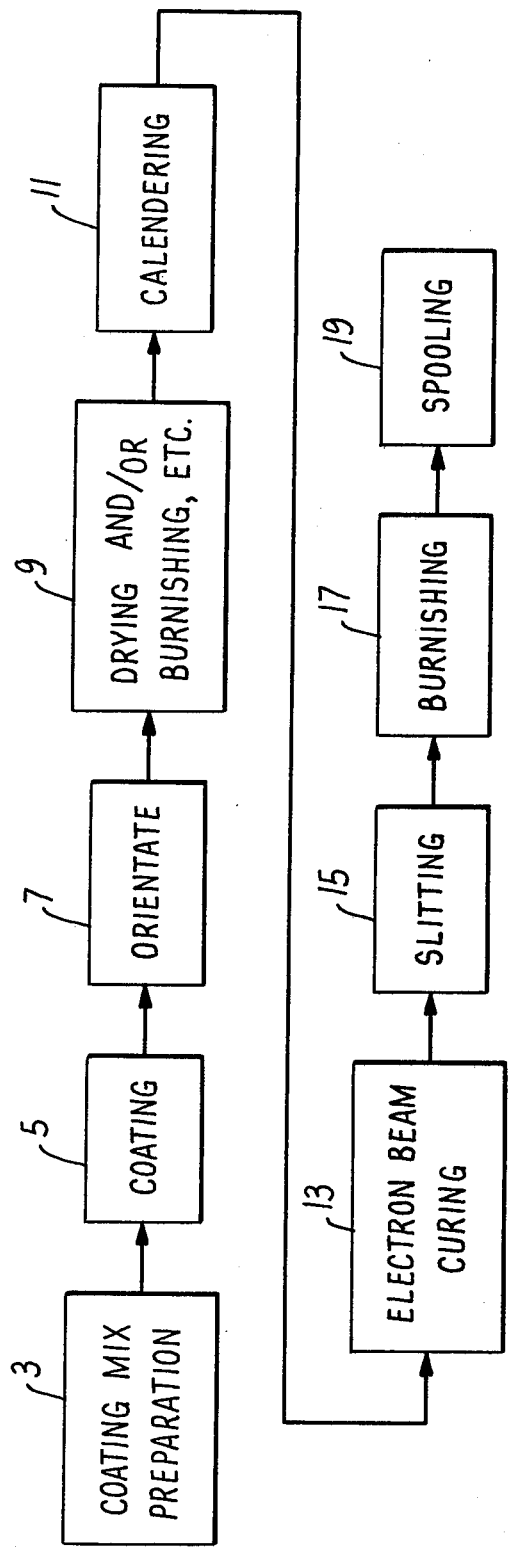
FIG. 1 is a block diagram showing the manufacture of a magnetic tape according to the process of the present invention.

The principal polymeric component of the magnetic binder composition in terms of quantity is a high molecular weight thermoplastic polymer. This component is essential to obtaining a magnetic medium having appropriate mechanical properties. These polymers are typically linear fully polymerized homopolymers or copolymers having a weight average molecular weight of at least about 50,000, usually in the range 100,000 to 800,000 and more usually 100,000 to 300,000. Examples of such polymers are styrene-butadiene copolymers, acrylonitrile-butadiene-copolymers, vinylacetate-vinylchloride copolymers, polyesters, polyamides, polycarbonates, polysulfones, polyacrylates, polyacrylic acid, polyvinylacetal, polyvinylbutyral, polyurethanes, and epoxy and phenoxy resins. Polyurethanes, both polyesterurethanes and polyetherurethanes, are a preferred class of high molecular weight thermoplastic polymers.

The other essential polymeric component of the magnetic binder is a radiation-curable acrylic prepolymer. As used herein the term "prepolymer" denotes low molecular weight partially polymerized molecules, including molecules commonly called oligomers. These prepolymers are preferably polyfunctional, that is, they contain more than one reactive acrylate group. Difunctional and trifunctional acrylate prepolymers are particularly preferred. Their weight average molecular weight will usually be less than about 10,000, more usually less than 5,000. They are susceptible to rapid radiation-induced crosslinking using either nonparticulate (ultraviolet, X-ray, or gamma) radiation or particulate ($\alpha$-particles, elecrons, $\beta$-particles, protons) radiation. Electron beam radiation is preferred because its generation, focussing, and shielding are simple relative to other forms of radiation. Examples of EB-curable acrylate prepolymers that may be used in the mixture are acrylated epoxy resins, acrylated urethanes, acrylated alkyd urethanes, acrylated polycaprolactams, acrylated polyethers, acrylated unsaturated acid modified drying oils, and acrylated polyesters. Specific examples of such prepolymers are netic particles that are commonly used are $\gamma$ ferric oxides, doped iron oxides, chromium dioxide, and elemental iron, cobalt and/or nickel. Acicular $\gamma$ ferric oxide is most commonly used. Particle size should be such as to obtain a good dispersion of the magnetic component in the mixture. The particle length of the $\gamma$ ferric oxide will usually be in the range of 0.2 to 1 $\mu$m and it will usually have an aspect ratio of 5:1 to 10:1. It will normally constitute about 60% to about 90% by weight of the magnetic binder composition after drying.

In order to disperse the magnetic particles and apply the magnetic binder composition as a thin coating to the nonmagnetic film substrate the polymeric components are dissolved in a common solvent such as tetrahydrofuran, cyclohexanone, methyl ethyl ketone, toluene, and methyl isobutyl ketone that will evaporate rapidly. The 1. Epoxy/Acrylate

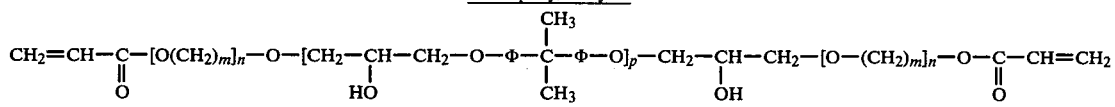

2. Polyester/Urethane/Acrylate

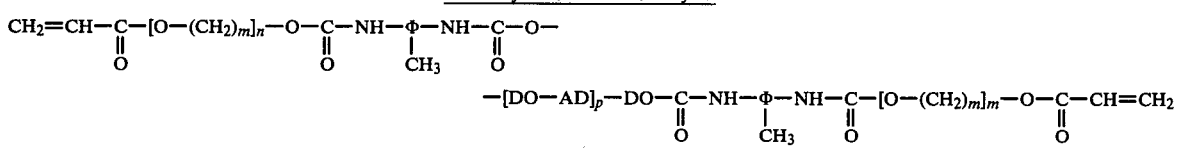

3. Polyether Acrylate

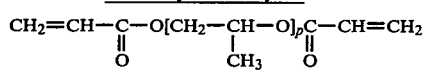

4. Polyester/Acrylate

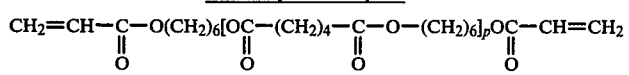

wherein
m = 1, 2, or 3
n = 0 or 1 (preferably 0)
p = 1, 2, or 3 (preferably 1)
DO = 1,6-hexanediol
AD = adipic acid
$\Phi$ = phenyl or substituted phenyl.

The ratio of the high molecular weight thermoplastic polymer to the acrylate prepolymer in the mixture can vary from 50:50 to 90:10 and is preferably in the range of 60:40 to 80:20 on a resin solids basis by weight. In other words the acrylate prepolymer can be from as little as 10% to as much as 50% of the total polymer in the binder.

Minor amounts of other conventional additives may be included in the magnetic binder composition if desired. Examples of such additives are: dispersants such as lecithin, organic esters of phosphoric acid, quaternary ammonium compounds, and other surfactants to aid in the deagglomeration and dispersal of the magnetic particles; conductive pigments, such as conductive carbon black, to reduce the electrical resistivity of the tape; and lubricants to minimize head-tape friction. The inclusion of materials, such as methacrylate polymers, that are preferentially degraded by radiation should be avoided. As indicated above, the binder contains no chemical curing agent.

The third essential ingredient in the magnetic binder is finely divided magnetic particles. Examples of magpolymer concentration in the solution will typically be in the range of 0.05 to 0.20 mg/ml. This solution, containing the homogeneously dispersed magnetic particles, is applied to the magnetic substrate using conventional coating machinery at a thickness in the range of about 2.5 to 15 $\mu$m. After the coating is applied, the coated substrate is dried to evaporate off the solvent leaving a solid coating that is dry to the touch.

After the solvent is evaporated from the coating the coated substrate is calendered and then exposed to radiation of sufficient energy and dose to cure the magnetic binder composition. The strength of the radiation will depend upon a number of factors such as the percentage of the acrylate prepolymer in the coating, the activity or crosslinkability of the acrylate prepolymer, the thickness of the coating and the duration of exposure. As indicated above, electron beam radiation is preferred. UV radiation is the least desirable since its use will normally require inclusion of photoinitiators in the binder and it is highly absorbed by additives such as pigments. Preferably, an electron beam energy of no more than 300 KeV is employed since higher energies do not result in a better cure of the binder and may cause damage to many magnetic tape substrate materials. The dose can vary from 1 to 15 Mrad.

The chemical reactions that occur during the curing are primarily radiation-induced free radical reactions, the most important of which are the direct crosslinking of high molecular weight thermoplastic polymer chains via hydrogen abstraction from the chains and crosslinking of those chains via polyfunctional prepolymer links. Other competing reactions are addition polymerization of the prepolymer molecules and grafting of the prepolymer molecules onto the thermoplastic polymer chains. These reactions result in an EB-cured tape that has improved mechanical properties as compared to prior tapes.

Referring now to the drawings, FIG. 1 shows the general plan for manufacturing a magnetic tape utilizing the present invention. Although this particular figure shows the manufacture of a tape, it is obvious that the same technique could be used to manufacture other magnetic media by making suitable modifications as are well-known to those skilled in the art. At 3, a coating mixture is prepared as is later described in the examples. This mixture is then coated at 5 on a tape utilizing well-known tape coating techniques. Before the tape has dried, it is ordinarily oriented as at 7 by passing it through a strong magnetic field. At 9 the tape is passed through a conventional drying oven which may be followed by burnishing or similar operations. The tape is then calendered at 11 and at this point the tape is dry, i.e. the binder is in a solid, thermoplastic state. The tape is now passed through an electron beam curing apparatus at 13 wherein the crosslinking reaction(s) take place. The tape may then be slit at 15, burnished at 17 and then spooled at 19. All of these operations are conventional in the tape making field and are well-known to those skilled in the art except step 13 which consists of passing a tape through a device wherein it is exposed to an electron beam.

Figure 2:
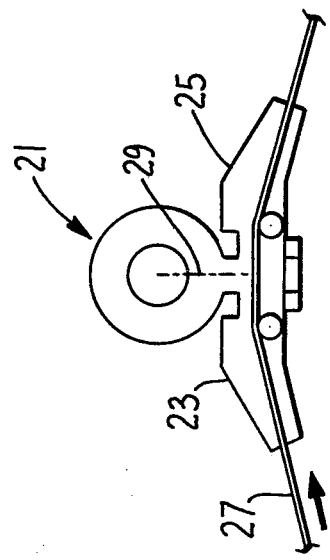
FIG. 2 is a side view of a coating and curing line wherein the curing is done by means of an electron beam.

FIG. 2 shows a typical electron beam curing process wherein an electron beam generator 21 is provided with suitable shielding 23 and 25. The tape is passed under the generator 21 and between the shields 23 and 25 so that the electron beam 29 impinges on the tape.

As is mentioned above, applicants' EB-cured binder exhibits much more crosslinking than EB-cured prior art binders. In order to demonstrate this a number of films of different polymers were prepared and the elastic modulus was tested before and after being subjected to an electron beam treatment. The elastic modulus of the free film is used here as a measure to reflect the crosslinkability or extent of crosslinking of a polymer when subjected to an electron beam. Example 1 shows the results which were obtained.

Example 1—Elastic Modulus of the Free Film

| Sample No. | Film Composition | EB Dosage (Mrad) | Elastic Modulus ($\times 10^4$ kPa) |
|---|---|---|---|
| 1A | Phenoxy resin | 0 | 212 |
| 1B | Phenoxy resin | 5 | 190 |
| 2A | Butadiene-Acrylonitrile copolymer | 0 | 0.17 |
| 2B | Butadiene-Acrylonitrile copolymer | 5 | 0.21 |
| 3A | Polyurethane (Estane 5701-Fl)[1] | 0 | 3.08 |
| 3B | Polyurethane (Estane 5701-Fl)[1] | 5 | 3.12 |
| 4A | EB-curable acrylate prepolymer (Celred 3600)[2] 50% and polyurethane (Estane 5701-Fl) 50% | 0 | 0.45 |
| 4B | EB-curable acrylate prepolymer (Celred 3600)[2] 50% and polyurethane (Estane 5701-Fl) 50% | 5 | 59.1 |

1. A linear polyesterurethane which is sold by B. F. Goodrich. Its properties are:

|  | Typical Value | ASTM No. |
|---|---|---|
| Specific Gravity | 1.20 | D12-27 |
| Hardness, Durometer | 87 | D-676 |
| Tensile Strength (kPa) | 52,000 | D-412 |
| Modulus at 30% Elongation (kPa) | 10,300 | D-412 |
| Elongation (%) | 575 |  |
| Graves Tear (g/cm) | 62,000 | D-624 |
| Low-Temperature Brittleness Freeze Point (°C.) | −62 | D-746 |
| Gehman Low-Temperature Freeze Point (°C.) | −28 | D-1053 |
| Taber Abrasion (mg loss) (CS17 Wheel, 1000 g weight, 5000 cycles) | 5 | D1044-49T |
| Processing Stock Temperature (°C.) | 171 |  |

2. A fast curing diacrylate ester of a bisphenol A type epoxy resin which is sold by Celanese Chemical Company. Its properties are:

| Viscosity @ 25° C. (cps) | 250,000 |
|---|---|
| Density g/cc | 1.18 |
| % Free acrylic acid | 5 maximum |
| Gardner color | 0.1 |
| Flash point (°C.) | >90 |
| % Active | 100 |
| Hydroxyl value | 200 |

It can be seen from the above that conventional tape binders such as phenoxy resins, butadieneacrylonitrile copolymers and polyurethane resins underwent little change when being subjected to an electron beam, while a composition made in accordance with the present invention, as is shown in samples 4A and 4B wherein 50% of an acrylate prepolymer was used in combination with the high molecular weight resin, underwent a very drastic change in elastic modulus.

Example 2—Formulation of EB-cured 5 cm Video Tape

Into a jar mill containing just enough one cm steel balls to be covered by the ingredient solution, was added the following ingredients:
 1515 gm of acicular ferric oxide
 7.8 gm of alumina powder
 62.1 gm of carbon black
 43.4 gm of lecithin
 31.9 gm of melamine type resin
 12.4 gm of butoxyethyl stearate
 71.1 gm of Estane 5714-F1 polyurethane[3]
 290 gm of methyl ethyl ketone
 290 gm of tetrahydrofuran
 680 gm of cyclohexanone 3. This polyurethane is a member of a family of polyurethane resins which are made by reacting p,p'-diphenylmethane diisocyanate, adipic acid and butanediol-1,4 in such proportions that all of the isocyanate groups have reacted to give a substantially unreactive polymer. It is sold by B. F. Goodrich and has the following characteristics:

| Specific Gravity | 1.21 |
|---|---|
| Hardness (Durometer A) | .88 |
| Tensile Strength at 23° C. (kPa) | 40,000 |
| 300% modulus at 23° C. (kPa) | 8,500 |
| Taber abrasion resistance (gram loss-CS17 | 0.0024 |

The above ingredients were milled for 48 hours, and after which was added a solution containing the following ingredients:
130 gm of Estane 5714-F1
85.5 gm of EB-curable acrylate prepolymer (Celred 3701)[4]
220 gm of tetrahydrofuran
210 gm of cyclohexanone
410 gm of methyl ethyl ketone 4. A nonvolatile diacrylate ester of a bisphenol A epoxy resin, which is sold by Celanese Chemical Company. Its typical properties are listed below:

| | |
|---|---|
| Viscosity @ 25° C. (cps) | 850,000 |
| Density, g/cc | 1.2 |
| Free Acrylic Acid | Less than 1% |
| Hydroxyl Value | 232 |
| Color | 5 maximum |
| Flash point (°C.) | 90 |

After the addition, the final mix was then milled for an additional six hours, followed by separations, filtration, coating, drying, calendering and electron beam curing at a dose of 10 Mrad.

Utilizing the same general procedures as outlined in Example 2 and the standard procedure of sandmilling, additional magnetic media were made and tested as follows:

Example 3—Higher Output of EB-cured High Energy Instrumentation Tape

| | Binder Composition |
|---|---|
| G162-71 | polyurethane (Estane 5701-Fl)/halogenated polymer (Ratio: 75/25) |
| G162-84A | polyurethane/EB-curable acrylate prepolymer (Estane 5701-Fl/Celred 3600) (Ratio: 60/40) |
| G162-84B | polyurethane/EB-curable acrylate prepolymer (Estane 5701-Fl/(Chempol acrylate prepolymer)[5] (Ratio: 60/40) |

5. A solvent-free epoxyacrylate resin which contains active acrylic unsaturation in the polymer molecule. It is sold by Freeman Company and has the following properties:

| | |
|---|---|
| Polymer solids, % by weight | 100 |
| Reactive monomer, % by weight | none |
| UV Photoinitiator, % by weight | none |
| Acid number | 3–10 |
| Color | 1–4 |
| Viscosity as supplied, Centipoise | 4000–6000 at 60° C. |
| | 1400–1800 at 70° C. |
| Density g/cc | 1.17–1.20 |

| Binder | Curing Method | Output[6] dB @ indicated Frequency (MHz) | | | |
|---|---|---|---|---|---|
| | | 0.2 | 1.0 | 1.5 | 2.0 |
| G162-71 | chemical | +1.4 | +1.3 | +1.6 | +1.9 |
| G162-84A | EB curing | +2.0 | +3.0 | +3.5 | +4.9 |
| G162-84B | EB curing | +1.8 | +2.7 | +3.4 | +4.0 |

6. Output was measured by Ampex FR-2000 at the indicated frequencies. A higher number indicates higher output, and better tape. The reference tape was Memorex 716 tape.

Example 4—Higher Output of EB-Cured and Floppy Disk

| | Binder Composition |
|---|---|
| G162-41 | polyurethane (Estane 5701-Fl) |
| G162-82C | polyurethane/EB-curable acrylate prepolymer (Estane 5701-Fl/Celred 3600) (Ratio: 55/45) |

| Binder | Curing Method | Output[7] (%) | | | |
|---|---|---|---|---|---|
| | | 00-2F | 34-2F | 00-1F | 34-1F |
| G162-41 | chemical | 96 | 94 | 96 | 92 |
| G162-82C | EB-cured | 110 | 107 | 115 | 108 |

7. The output was measured by 3-Phenix Certifier. The higher the percentage, the better the tape. 100% was the reference percentage.

Example 5—Better Performance of EB-cured 5 cm Video Tape

| | Binder Composition |
|---|---|
| G162-47 | polyurethane (Estane 5714-Fl)/phenoxy resin (PKHH)[8] (Ratio: 67/33) |
| G162-85C | polyurethane (Estane 5714-Fl)/EB-curable acrylate prepolymer (Celred 3701) (Ratio: 70/30) |

8. A phenoxy resin made from bis-phenol-A and epichlorohydrin, sold by Union Carbide Chemical Company under the trade name of Bakelite phenoxy resin PKHH, and having the following properties:

| | |
|---|---|
| Specific Gravity | 1.18 |
| Viscosity of 40% solids in MEK, Brookfield RVF, 20 rpm No. 5 spindle | 5,500 to 7,700 cps. |
| Reduced Viscosity (0.2 g/100 ml dimethylformamide) | 0.4 to 0.6 |
| Ultimate Tensile Strength | 62,000 to 65,000 kPa |
| Ultimate Tensile Elongation | 50% to 100% |
| Softening Temperature | 100° C. |
| Permeability (25 micron free film at 25° C.) | |
| Water Vapor (24 hrs/645 cm$^2$) | 138 g/mm |
| Oxygen (24 hrs/645 cm$^2$) | 200 to 310 cc/mm |
| Carbon Dioxide (24 hrs/645 cm$^2$) | 590 to 1180 cc/mm |
| Bulking Value | 1.18 g/cc |

| Binder | Curing Method | Gloss | Performance Chroma SNR[10] (Ref. 50.0 dB) | Video SNR[11] (Ref. 47.8 dB) | Binder Durability[12] | Activity Detector[13] | |
|---|---|---|---|---|---|---|---|
| G162-47 | chemical | 74 | −1.0 | 0 | 2′/40/ 10/4 | 4.0 | 6.0 |
| G162-85C | EB-cured | 93 | +2.0 | +1.0 | 2′30″/ 15/5/4 | 1.6 | 3.0 |

9. Gloss reading was used to indicate the smoothness of the tape surface, the higher the reading, the smoother the surface.

10. Chroma SNR (signal to noise ratio) was measured by using spectra analyzer; −1.0 means 1 dB worse than the reference, +2.0 means 2 dB better than the reference.

11. Video SNR was measured by Rhode & Schwaz meter. 0 means reference, +1.0 means 1.0 dB better than reference.

12. Binder durability was measured by Ampex VR-2000
   1st Number represents the time length of measurement, e.g. 2′; measured for 2 minutes 2′30″ measured for 2½ minutes
   2nd Number represents percentage shed on the head
   3rd Number represents percentage shed on the drum
   4th Number represents general rating 1–10, lower the number, the better.

13. Activity Detector was measured by homemade instrument using electrical reading to test the physical flaw of the tape. Using a scale of 0 to 10, lower the number, the better.

We claim:

1. A magnetic medium comprising:
   (a) a nonmagnetic substrate coated with
   (b) a magnetic binder composition comprising
      (i) a radiation-cured mixture of a high molecular weight fully polymerized thermoplastic polymer comprising a styrene-butadiene copolymer, acrylonitrile-butadiene copolymer, vinylacetate-vinylchloride copolymer, polyester, polyamide, polycarbonate, polysulfone, polyacrylate, polyacrylic acid, polyvinylacetal, polyvinylbutyral, polyurethane, epoxy or phenoxy resin, having a weight average molecular weight of at least 50,000, and a radiation-curable acrylate prepolymer having a weight average molecular weight of less than 10,000, wherein the ratio of high molecular weight thermoplastic polymer to acrylate prepolymer is from 50:50 to 90:10 on a polymer solids basis by weight, and
      (ii) magnetic particles dispersed in the radiation-cured mixture.

2. A process for making the magnetic medium of claim 1 comprising the steps of
   (a) preparing a fluid mixture comprising:
      (i) a high molecular weight fully polymerized thermoplastic polymer comprised of a styrene-butadiene copolymer, acrylonitrile-butadiene copolymer, vinylacetate-vinylchloride copolymer, polyester, polyamide, polycarbonate, polysulfone, polyacrylate, polyacrylic acid, polyvinylacetal, polyvinylbutyral, polyurethane, epoxy or phenoxy resin having a weight average molecular weight of at least 50,000,
      (ii) a radiation-curable acrylate prepolymer having a weight average molecular weight of less than 10,000, with the prepolymer being employed in an amount such that the ratio of high molecular weight thermoplastic polymer to acrylate prepolymer is from 50:50 to 90:10 on a polymer solids basis by weight,
      (iii) a solvent for the thermoplastic polymer and acrylate prepolymer, and
      (iv) dispersed magnetic particles;
   (b) coating the fluid mixture onto a nonmagnetic substrate;
   (c) drying the coated substrate to evaporate the solvent and solidify the coating; and
   (d) exposing the dried coated substrate to sufficient radiation to cure the coating.

3. The process of claim 2 wherein the radiation is electron beam radiation.

4. The process of claim 2 wherein the radiation is electron beam radiation, the high molecular weight polymer is a linear polyurethane having a molecular weight of at least 50,000 and the radiation-curable acrylate prepolymer is a di- or trifunctional acrylate prepolymer.

5. The process of claim 4 wherein the radiation-curable acrylate prepolymer is an acrylated epoxy, acrylated urethane, acrylated alkyd urethane, acrylated polycaprolactam, acrylated polyether, acrylated polyester, or acrylated unsaturated acid modified drying oil.

6. The process of claim 2 wherein the radiation curable acrylate prepolymer is of the formula

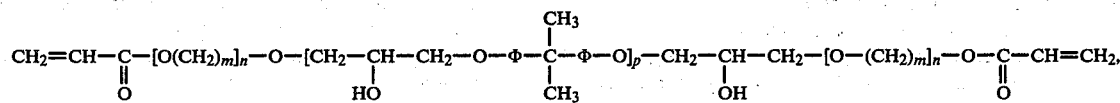

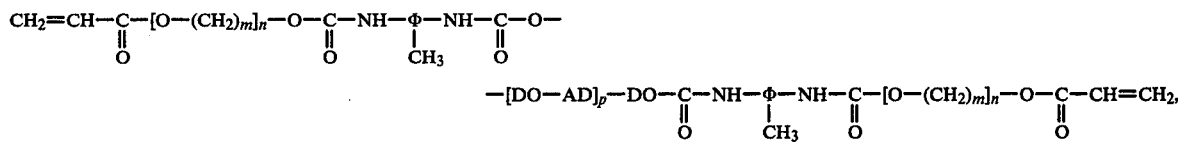

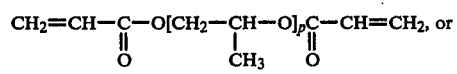

-continued

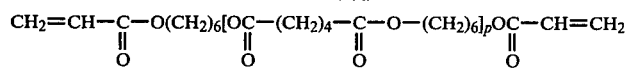

wherein
- m = 1, 2, or 3
- n = 0 or 1
- p = 1, 2, or 3
- DO = 1,6-hexanediol
- AD = adipic acid
- Φ = phenyl or substituted phenyl.

7. The magnetic medium of claim 1 wherein the radiation is electron beam radiation, the high molecular weight polymer is a linear polyurethane having a molecular weight of at least 50,000 and the radiation-curable acrylate prepolymer is a di- or trifunctional acrylate prepolymer.

8. The magnetic medium of claim 7 wherein the radiation-curable acrylate prepolymer is an acrylated epoxy, acrylated urethane, acrylated alkyd urethane, acrylated polycaprolactam, acrylated polyether, acrylated polyester, or acrylated unsaturated acid modified drying oil.

9. The magnetic medium of claim 1 wherein the radiation curable acrylate prepolymer is of the formula

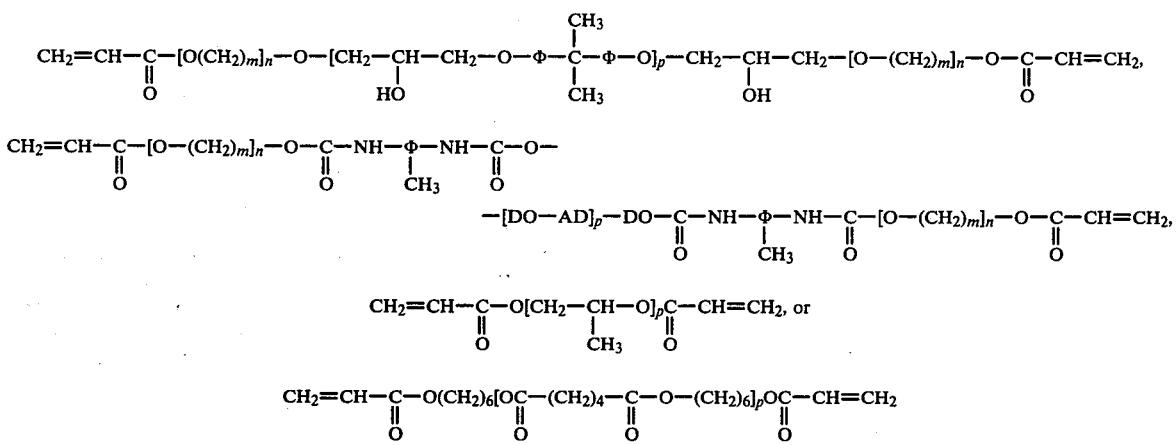

wherein
- m = 1, 2, or 3
- n = 0 or 1
- p = 1, 2, or 3
- DO = 1,6-hexanediol
- AD = adipic acid
- Φ = phenyl or substituted phenyl.

10. A magnetic medium comprising:
  (a) a non-magnetic substrate coated with
  (b) a magnetic binder composition comprising
    (i) a radiation-cured mixture of a high molecular weight linear polyurethane polymer having a weight average molecular weight of at least 50,000, and a radiation-curable acrylate prepolymer having a weight average molecular weight of less than 10,000, wherein the ratio of polyurethane polymer to acrylate prepolymer is from 50:50 to 90:10 on a polymer solids basis by weight, and
    (ii) magnetic particles dispersed in the radiation cured mixture.

11. A process for making the magnetic medium of claim 10 comprising the steps of
  (a) preparing a fluid mixture comprising:
    (i) a high molecular weight linear polyurethane polymer having a weight average molecular weight of at least 50,000,
    (ii) a radiation-curable acrylate prepolymer having a weight average molecular weight of less than 10,000, with said prepolymer being employed in an amount such that the ratio of high molecular weight thermoplastic polymer acrylate prepolymer is from 50:50 to 90:10 on a polymer solids basis by weight,
    (iii) a solvent for the thermoplastic polymer and acrylate prepolymer, and
    (iv) dispersed magnetic particles;
  (b) coating the fluid mixture onto a nonmagnetic substrate;
  (c) drying the coated substrate to evaporate the solvent and solidify the coating; and
  (d) exposing the dried coated substrate to sufficient radiation to cure the coating.

* * * * *